T. B. ROWELL.
UNIVERSAL SHAFT-COUPLINGS.

No. 187,486.    Patented Feb. 20, 1877.

ATTEST:
O. H. Adix
E. D. Chapin

INVENTOR:
Theodore B. Rowell,
By G. S. Chapin, Atty.

UNITED STATES PATENT OFFICE

THEODORE B. ROWELL, OF BEAVER DAM, WISCONSIN.

IMPROVEMENT IN UNIVERSAL SHAFT-COUPLINGS.

Specification forming part of Letters Patent No. 187,486, dated February 20, 1877; application filed September 4, 1876.

*To all whom it may concern:*

Be it known that I, THEODORE B. ROWELL, of Beaver Dam, in the county of Dodge, and State of Wisconsin, have invented a new and useful Improvement in Shaft-Couplings, of which the following is a specification:

The nature of my invention consists in a hollow globular or ellipsoidal coupling shell or ball, through which, transversely and at opposite sides of the minor diameter thereof, holes are formed to receive the bolts which connect the ears of the couplings by passing through them, the shell being filled with oil and waste, to lubricate the bolts, which serve as journals. I am aware that a flat-ended circular shell is shown in the patent granted W. P. Dugdale on February 6, 1872, and that said shell is provided with four hollow journals, in which are placed wicks crossing transversely the shell, and that said journals are blind, or not shown at the outsides of the ears or forked sockets. I therefore do not claim to be the inventor of a hollow-shell coupler provided with hollow journals, but confine myself to the shell with bolts passing transversely through it and into the ears, the bolts acting as journals to hold the parts in working position.

The advantages of this construction are cheapness, durability, and simplicity of application over other couplings which are flexible to permit shafts to run out of line. As, for instance, if the bolts become worn, as they will in use, they can readily be replaced by new ones; while, when hollow journals are used, as in the patent referred to, the whole case has to be replaced by a new one, if journals are worn.

Figure 1:
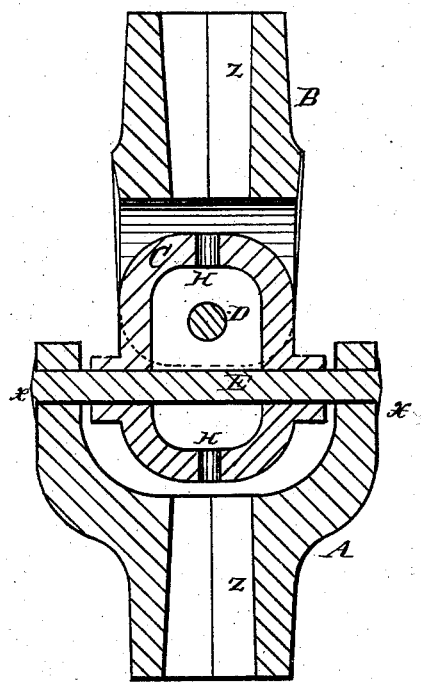
Figure 2:
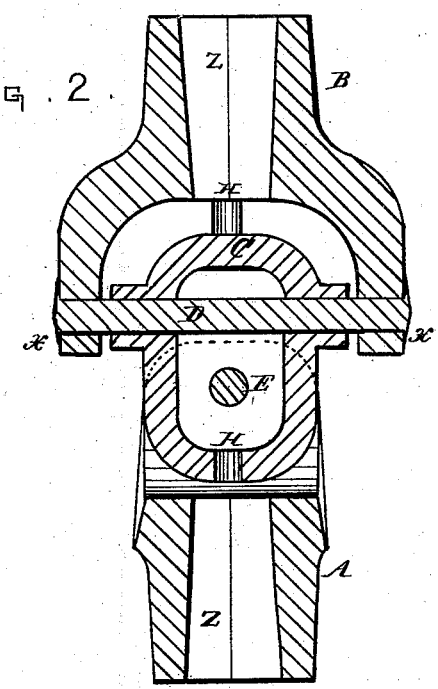

In the drawings, Figure 1 is a longitudinal section of my improved shaft-coupling. Fig. 2 is a longitudinal section of my improved shaft-coupling, taken at right angles to Fig. 1 in the center.

A B represent the sleeves, which are cast hollow at $z\ z$, for the reception of the connecting-shafts, and which terminate in ears $x\ x,\ x\ x$, for receiving the ends of the bolts E D. C represents the ball, which in this construction is somewhat oblong, as shown, and cast hollow, to receive oil and packing for lubricating the bolts D E, which pass through the ball at opposite sides of its center, and at right angles, so as not to be in the way of each other. The ball, however, may be spherical, or have any form which can be placed inside of the ears $x\ x,\ x\ x$. The oblong form I, however, consider the most suitable.

The bolts E D should be turned to fit nicely in their bearings in the ball, their ends being headed or riveted to the outside of the ears $x\ x$, or otherwise securely fastened. Holes H are formed in the hollow ball C, for the convenience of placing oil and packing therein, after which the holes are to be closed by a screw tapped into them, or a plug of wood or other suitable material inserted therein. This arrangement is such that the bolts E D will be lubricated for a long period of time, without dripping or waste of oil.

The former construction of knuckle or ball joints consists in a solid ball with bolts tapped through the ears into it. In such case, the lubricating is done from the outside, causing constant watching, and waste, and dripping of oil.

I claim and desire to secure by Letters Patent of the United States—

The hollow globular or ellipsoidal shell C, provided with holes transversely through it, on opposite sides of its minor diameter, in combination with bolts put through the shell, and the ears of the couplers, said bolts acting as journals to give flexibility to the coupling, and being riveted to the ears, as described and shown.

THEODORE B. ROWELL.

Witnesses:
H. W. KEYES,
L. W. BARBER.